United States Patent
Uno et al.

(10) Patent No.: US 7,281,909 B2
(45) Date of Patent: Oct. 16, 2007

(54) HYBRID COMPRESSOR SYSTEM FOR REFRIGERATION CYCLE SYSTEM

(75) Inventors: Keiichi Uno, Kariya (JP); Yasushi Suzuki, Chiryu (JP); Shigeki Iwanami, Okazaki (JP); Hironori Asa, Okazaki (JP); Kazuhide Uchida, Hamamatsu (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 520 days.

(21) Appl. No.: 10/686,659

(22) Filed: Oct. 17, 2003

(65) Prior Publication Data

US 2004/0079098 A1   Apr. 29, 2004

(30) Foreign Application Priority Data

Oct. 18, 2002 (JP) ............................. 2002-304511
Aug. 6, 2003 (JP) ............................. 2003-288186

(51) Int. Cl.
F04B 49/00 (2006.01)
F04B 49/02 (2006.01)
F04B 17/00 (2006.01)

(52) U.S. Cl. ..................... 417/374; 417/15; 417/16; 417/223; 417/34

(58) Field of Classification Search .................. 417/15, 417/16, 34, 223, 374; 123/198 R
See application file for complete search history.

(56) References Cited

U.S. PATENT DOCUMENTS

| | | | |
|---|---|---|---|
| 6,375,436 B1* | 4/2002 | Irie et al. ..................... | 417/223 |
| 6,450,275 B1* | 9/2002 | Gabriel et al. ............. | 180/65.4 |
| 2001/0015070 A1* | 8/2001 | Hara ........................... | 62/133 |
| 2001/0018025 A1* | 8/2001 | Sakai et al. ................. | 417/374 |
| 2003/0118450 A1* | 6/2003 | Iwanami et al. .............. | 417/15 |

FOREIGN PATENT DOCUMENTS

| | | |
|---|---|---|
| JP | A-10-339274 | 12/1998 |
| JP | A-2000-130323 | 5/2000 |

* cited by examiner

Primary Examiner—Anthony D. Stashick
Assistant Examiner—Jessica L Frantz
(74) Attorney, Agent, or Firm—Posz Law Group, PLC

(57) ABSTRACT

A compressor device compresses refrigerant of a refrigeration cycle system and is connected to an engine and a motor to selectively receive drive force from one or both of the engine and the motor. When the engine is operated in an idling mode, a control apparatus energizes the motor to drive the compressor device alone or in cooperation with the engine and controls the energization of the motor to adjust load on the engine.

12 Claims, 10 Drawing Sheets

HYBRID COMPRESSOR SYSTEM FOR REFRIGERATION CYCLE SYSTEM

CROSS REFERENCE TO RELATED APPLICATION

This application is based on and incorporates herein by reference Japanese Patent Application No. 2002-304511 filed on Oct. 18, 2002 and Japanese Patent Application No. 2003-288186 filed on Aug. 6, 2003.

BACKGROUND OF THE INVENTION

1. Field of the Invention

The present invention relates to a hybrid compressor system for a refrigeration cycle system of a vehicle, particularly a vehicle having an idling-stop system or a hybrid vehicle.

2. Description of Related Art

Due to the virtue of low fuel consumption, vehicles having an idling-stop system and hybrid vehicles are advantageously marketed lately. Such a vehicle stops its engine according to a driving state (such as temporarily stopped state or a low speed driving state) of the vehicle. Thus, a compressor device of a refrigeration cycle system, which is driven by drive force of such an engine, is also stopped when the engine is stopped, resulting in the non-functional refrigeration cycle system.

To address such a disadvantage, for example, Japanese Unexamined Patent Publication No. 2000-130323 discloses one hybrid compressor system. In this hybrid compressor system, a pulley, which is rotated by drive force of an engine, is connected to one end of a rotatable shaft of a compressor device through an electromagnetic clutch, and a motor is connected to the other end of the rotatable shaft of the compressor device. When the engine is stopped, the electromagnetic clutch is disconnected, and thus the compressor device is driven by the motor. This allows achievement of cooling performance of the refrigeration cycle system irrespective of the operational state of the engine.

However, in the hybrid compressor system disclosed in Japanese Unexamined Patent Publication No. 2000-130323, the motor is used as an auxiliary drive source for driving the compressor device at the time of engine stop, and this publication does not disclose an idea of using a combination of the engine and the motor for driving the compressor device.

In a case where the engine is driven in an idling mode in a temporarily stopped state of a vehicle due to, for example, an operational state of any other auxiliary device or a thermal load state of the refrigeration cycle system, the compressor device is driven by the engine. This causes an increase in the load of the engine, and thus the fuel consumption in the temporarily stopped state of the vehicle cannot be improved.

This is also true in a case of an ordinary vehicle at the time of driving the engine in the idling mode. That is, an idling speed of the engine is increased due to, for example, an operational state of an auxiliary device or a thermal load state of the refrigeration cycle system, resulting in an increase in the fuel consumption.

SUMMARY OF THE INVENTION

The present invention addresses the above disadvantages. Thus, it is an objective of the present invention to provide a hybrid compressor system capable of reducing load on an engine at the time of operating the engine in an idling mode and thereby reducing fuel consumption.

To address the objective of the present invention, there is provided a hybrid compressor system for a refrigeration cycle system of a vehicle that includes an internal combustion engine and an electric power source. The hybrid compressor system includes an electric motor, a compressor device and a control apparatus. The electric motor is rotated when the motor is energized by electric power supplied from the power source. The compressor device compresses refrigerant of the refrigeration cycle system and is connected to the engine and the motor to selectively receive drive force from one or both of the engine and the motor. The control apparatus controls the motor. When the engine is operated in an idling mode, the control apparatus energizes the motor to drive the compressor device alone or in cooperation with the engine and controls the energization of the motor to adjust load on the engine.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to FIGS. 1 to 6.

Figure 1:
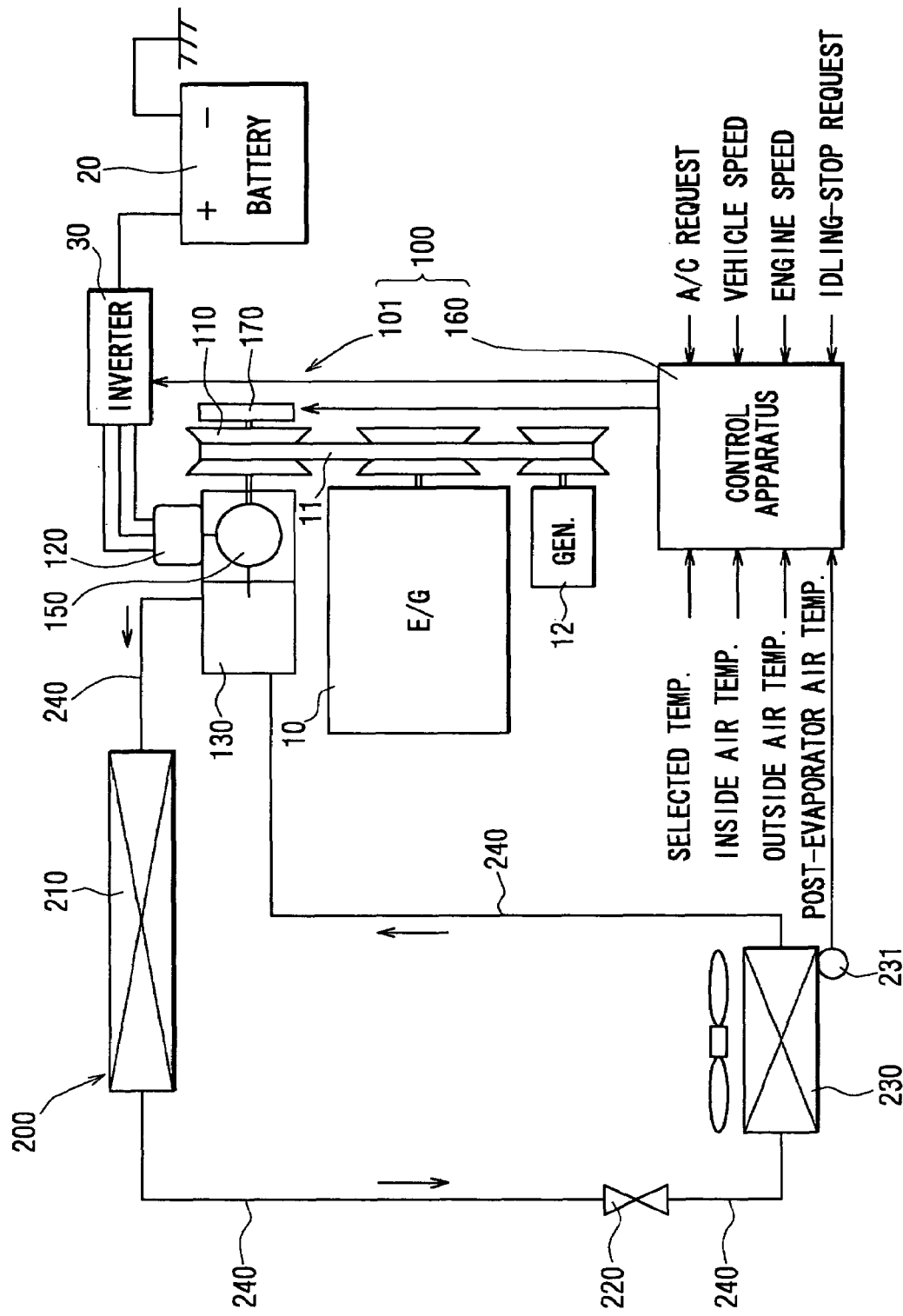
FIG. 1 is a schematic view of a refrigeration cycle system according to a first embodiment of the present invention.

With reference to FIG. 1, a hybrid compressor system 100 is embodied in a refrigeration cycle system 200 for a vehicle having an idling-stop system, which stops an engine (internal combustion engine) 10 when the vehicle is temporarily stopped, for example, at traffic lights, in traffic jams or the like. The hybrid compressor system 100 includes a hybrid compressor apparatus 101 and a control apparatus 160.

The refrigeration cycle system 200 forms a refrigeration cycle of a known type and includes a compressor device 130 of the hybrid compressor apparatus 101. The compressor device 130 compresses refrigerant, which is circulated through the refrigeration cycle, and discharges pressurized high temperature refrigerant. Furthermore, the compressor device 130 forms a closed circuit in cooperation with a condenser 210, an expansion valve 220 and an evaporator 230, which are connected through a refrigerant pipe system 240. The condenser 210 condenses and liquefies the compressed refrigerant, which is compressed by and discharged from the compressor device 130. The expansion valve 220 adiabatically expands the liquefied refrigerant. The evaporator 230 evaporates the expanded refrigerant and cools air, which passes through the evaporator 230, through use of latent heat of vaporization. An evaporator temperature sensor 231, which measures the temperature of the cooled air (post-evaporator air temperature), is arranged downstream of the evaporator 230.

Figure 2:
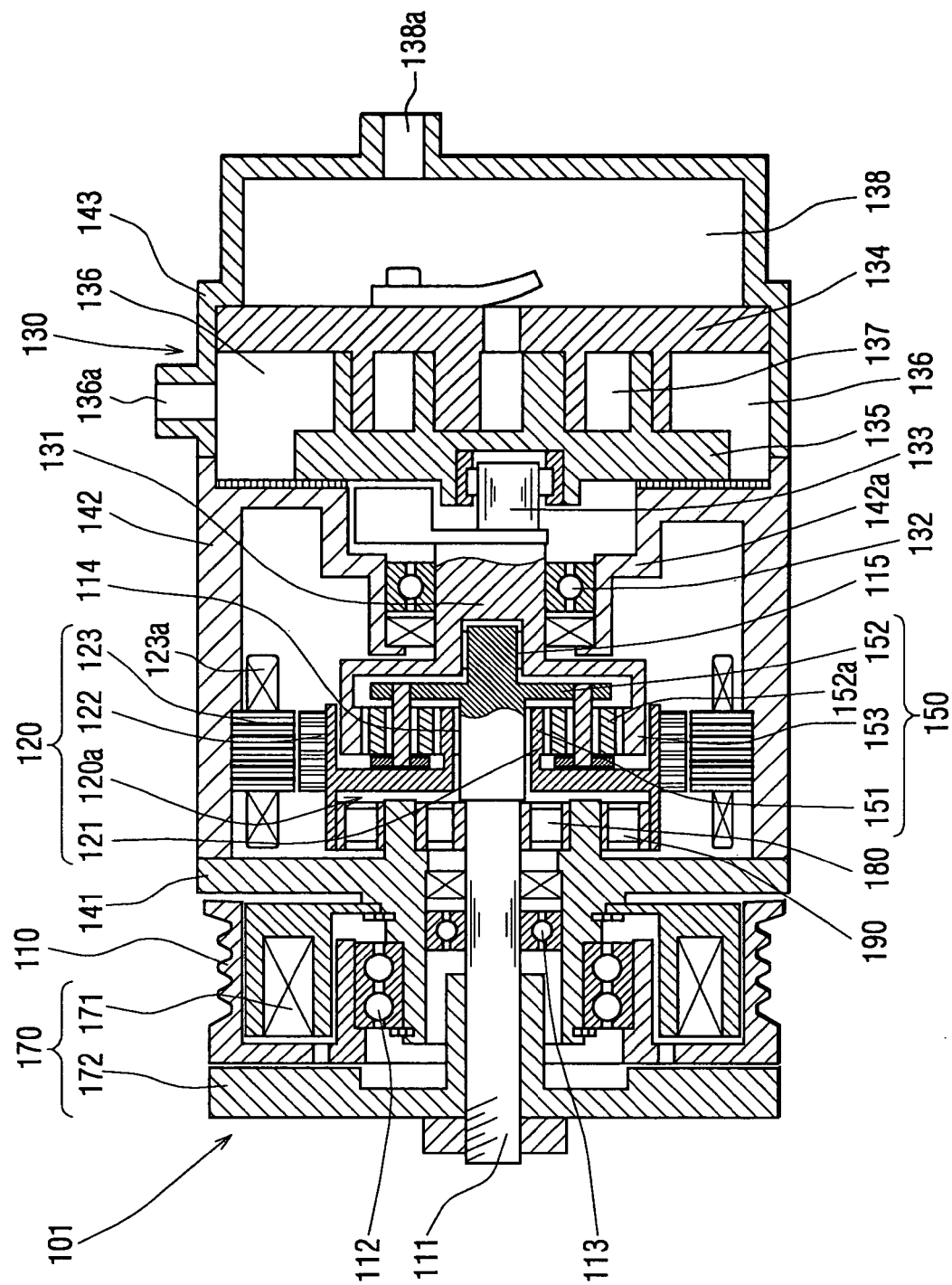
FIG. 2 is a cross sectional view of a hybrid compressor apparatus of the refrigeration cycle system of FIG. 1.

The hybrid compressor apparatus 101 includes a pulley 110, an electromagnetic clutch 170, an electric motor 120, the compressor device 130 and a planetary gear arrangement 150, details of which will be described with reference to FIG. 2.

The pulley 110 is rotatably supported by a pulley bearing 112, which is secured to a front housing 141. The pulley 110 is rotated by drive force of the engine 10 transmitted to the pulley 110 through a belt 11 (FIG. 1). A rotatable shaft 111 extends along a rotational axis of the pulley 110 and is rotatably supported by a bearing 113 secured to the front housing 141. The rotatable shaft 111 serves as a rotatable shaft of the pulley 110 when the pulley 110 is connected to a hub 172 of an electromagnetic clutch 170 described below.

A one-way clutch 180, which is secured to the front housing 141 through an outer peripheral side thereof, is arranged about the rotational axis of the rotatable shaft 111. The one-way clutch 180 allows rotation of the rotatable shaft 111 in a first direction (normal rotational direction) of the pulley 110 and prevents rotation of the rotatable shaft 111 in a second direction (reverse rotational direction) of the pulley 110, which is opposite from the first direction, through gear meshing.

The electromagnetic clutch 170, which serves as a connecting mechanism, selectively enables and disables conduction of drive force from the pulley 110 to the compressor device 130. The electromagnetic clutch 170 includes a coil arrangement 171 and the hub 172. The coil arrangement 171 includes a coil and is secured to the front housing 141, and the hub 172 is secured to one end of the rotatable shaft 111. As is known in the art, in the electromagnetic clutch 170, when the coil arrangement 171 is energized, the hub 172 is attracted to and is engaged with the pulley 110, so that the hub 172 conducts the drive force of the pulley 110 to the rotatable shaft 111, i.e., the electromagnetic clutch 170 is activated or is turned on. On the other hand, when the coil arrangement 171 is deenergized, the hub 172 is disengaged from the pulley 110, so that the drive force of the pulley 110 is no longer conducted to the rotatable shaft 111, i.e., the electromagnetic clutch 170 is deactivated or is turned off.

The motor 120 includes a rotor 120a and a stator 123 and is received in an intermediate housing 142. The motor 120 is constructed as a surface permanent-magnet (SPM) motor, in which magnets (permanent magnets) 122 are arranged in an outer peripheral surface of the rotor 120a. The motor 120 receives the planetary gear arrangement 150 in a space defined radially inward of the rotor 120a. A part of a sun gear 151 of the planetary gear arrangement 150 serves as a rotatable shaft 121 of the motor 120.

A one-way clutch 190 is arranged between the rotor 120a and the front housing 141. The one way clutch 190 prevents rotation of the rotor 120a in the first direction (the normal rotational direction of the pulley 110) through gear meshing and allows rotation of the rotor 120a in the second direction (the reverse rotational direction of the pulley 110).

The stator 123 includes a coil arrangement 123a having a coil and is securely press-fitted to an inner peripheral surface of the intermediate housing 142. When electric power is applied to the coil arrangement 123a from a vehicle battery (serving as an electric power source of the present invention) 20 through an inverter 30 (FIG. 1), the rotor 120a is driven to rotate.

The compressor device 130 is constructed as a fixed displacement compressor device where a displacement per rotation of the compressor device 130 is set to a predetermined amount. More specifically, the compressor device 130 is constructed as a scroll type compressor device. The compressor device 130 includes a stationary scroll 134 and a moveable scroll 135. The stationary scroll 134 is securely held in an end housing 143, which is placed on one side of the motor 120 opposite from the pulley 110. The movable scroll 135 is revolved by an eccentric shaft 133 of a rotatable shaft 131 of the compressor device 130. When the stationary scroll 134 and the movable scroll 135 are engaged with each other, an intake chamber 136 is defined radially outward of the stationary scroll 134 and the movable scroll 135, and a compression chamber 137 is defined between the stationary scroll 134 and the movable scroll 135. Refrigerant, which is drawn into the intake chamber 136 through an intake opening 136a formed in a peripheral wall of the end housing 143, is compressed in the compression chamber 137 and is then discharged though a discharge chamber 138 and also through a discharge opening 138a formed in an end wall of the end housing 143.

The rotatable shaft 131 of the compressor device 130 is rotatably supported by a bearing 132 secured to a protruding wall 142a, which protrudes inwardly from the intermediate housing 142 on one side thereof opposite from the pulley 110. The other end of the rotatable shaft 111 of the pulley 110 is fitted into a recess of the rotatable shaft 131 of the compressor device 130. The rotatable shaft 131 of the compressor device 130 and the rotatable shaft 111 of the pulley 110 are rotatably supported by a bearing 115, which allows the rotatable shaft 131 and the rotatable shaft 111 to rotate independently of each other.

The rotatable shaft 111 of the pulley 110, the rotatable shaft 121 of the motor 120 and the rotatable shaft 131 of the compressor device 130 are connected to the planetary gear arrangement 150, which is arranged in the rotor 120a.

The planetary gear arrangement 150 serves as a drive force distributing mechanism of the present invention. The planetary gear arrangement 150 distributes the drive force, which is supplied from the pulley 110 (engine 10), to the motor 120 and the compressor device 130 and conducts the drive force, which is supplied from the motor 120, to the pulley 110 and the compressor device 130. More specifically, the planetary gear arrangement 150 includes the sun gear 151, a planetary carrier 152, pinions 152a and a ring gear 153. The sun gear 151 is arranged in the center of the planetary gear arrangement 150. The planetary carrier 152 is connected to the pinions 152a, which rotate and revolve around the sun gear 151. The ring gear 153 is arranged radially outward of the pinion 152a.

The rotatable shaft 111 of the pulley 110 is connected to the planetary carrier 152. The rotatable shaft 121 (the rotor 120a) of the motor 120 is connected to the sun gear 151. The rotatable shaft 131 of the compressor device 130 is connected to the ring gear 153. The sun gear 151 is supported by a bearing 114 in a manner that allows the sun gear 151 to rotate independently of the rotatable shaft 111 of the pulley 110.

Referring back to FIG. 1, the control apparatus 160 receives an air conditioning (A/C) request signal for requesting air conditioning of the passenger compartment, a vehicle speed signal, an engine speed signal, an idling-stop request signal, a selected temperature signal indicative of the temperature selected by a passenger, an inside air temperature (air temperature inside the passenger compartment) signal, an outside air temperature (air temperature outside the passenger compartment) signal and a post-evaporator air temperature signal from the evaporator temperature sensor 231. Based on these signals, the control apparatus 160 controls operation of the motor 120 and activation of the electromagnetic clutch 170. Specifically, the control apparatus 160 changes the rotational speed of the motor 120 by changing the electric power supplied from the battery 20 though switching on and off of a switching element in the inverter 30. Furthermore, the control apparatus 160 connects and disconnects between the pulley 110 and the rotatable shaft 111 of the pulley 110 through switching on and off of the power supply to the coil arrangement 171 of the electromagnetic clutch 170.

Furthermore, the control apparatus 160 determines a discharge amount of refrigerant to be discharged from the compressor device 130 based on the thermal load of the refrigeration cycle system 200 and also determines the rotational speed of the compressor device 130 for achieving the determined discharge amount of refrigerant to be discharged from the compressor device 130. The discharge amount of refrigerant is the amount of refrigerant discharged from the compressor device 130 per unit time and is obtained by multiplying the displacement of the compressor device 130 per rotation of the compressor device 130 by a rotational speed of the compressor device 130. When the rotational speed of the compressor device 130 is increased, the discharge amount of refrigerant is increased accordingly. Furthermore, the rotational speed of the motor 120 is determined based on the rotational speed of the pulley 110 and the rotational speed of the compressor device 130 based on an alignment chart of the planetary gear arrangement 150 shown in FIG. 3. The alignment chart of FIG. 3 will be described later.

The thermal load of the refrigeration cycle system 200 is obtained as a difference between the required temperature of air to be discharged into the passenger compartment and the post-evaporator air temperature. Here, the required temperature of air to be discharged into the passenger compartment is obtained from a predetermined equation based on the selected temperature, the inside air temperature (air temperature inside the passenger compartment) and the outside air temperature (air temperature outside the passenger compartment).

Figure 3:
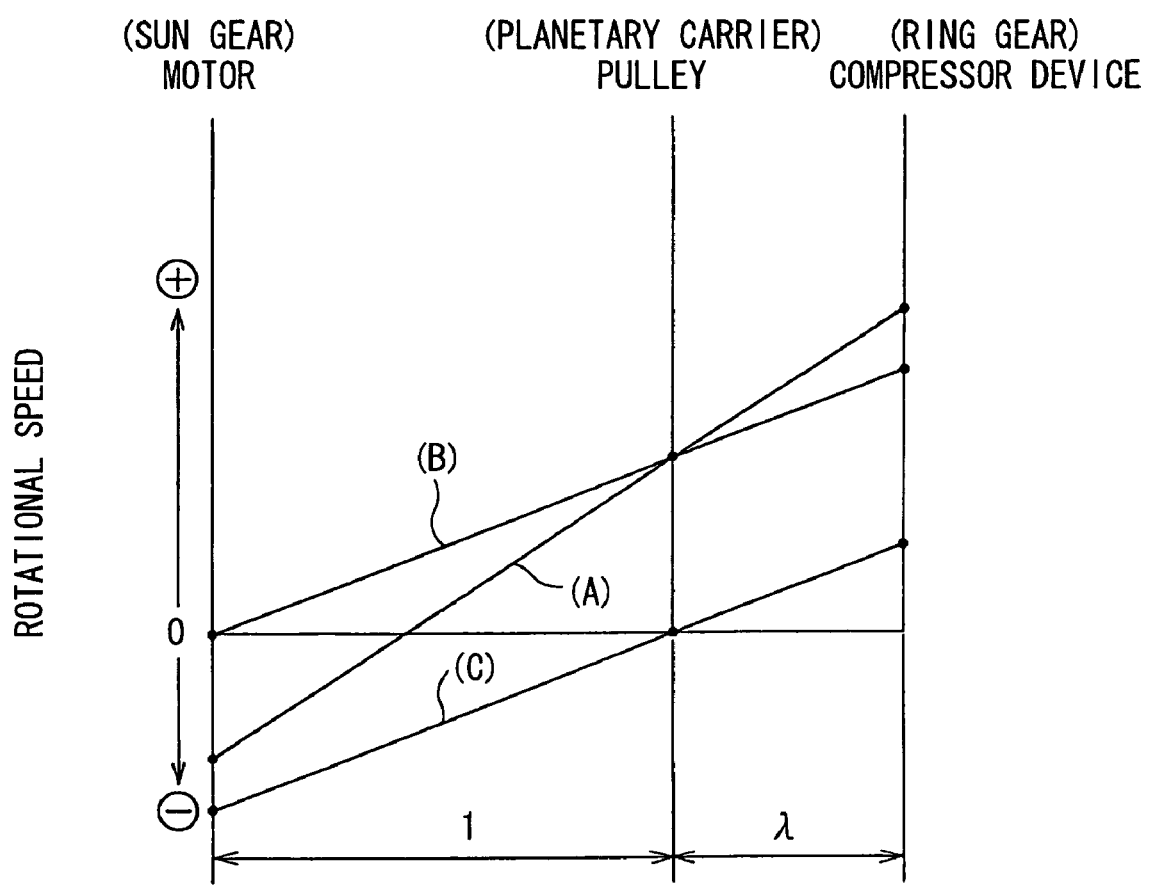
FIG. 3 is an alignment chart showing a rotational speed of a motor, a rotational speed of a pulley, a rotational speed of a compressor device of the hybrid compressor apparatus of FIG. 2.

Next, the operation will be described with reference to FIG. 3. FIG. 3 is the alignment chart showing a relationship among the rotational speed of the pulley 110, the rotational speed of the motor 120 and the rotational speed of the compressor device 130, all of which are connected to the planetary gear arrangement 150. As is known in the art, in the alignment chart of FIG. 3, the coordinate of the sun gear 151, the coordinate of the planetary carrier 152 and the coordinate of the ring gear 153 (from the left side to the right side in this order in FIG. 3) are indicated along the axis of abscissas and correspond to the motor 120 connected to the sun gear 151, the pulley 110 connected to the planetary carrier 152 and the compressor device 130 connected to the ring gear 153, respectively. Each interval along the axis of abscissas is determined based on the gear ratio λ between the sun gear 151 and the ring gear 153. In this instance, the gear ratio λ is set to be 0.5. The rotational speed of the sun gear 151, the rotational speed of the planetary carrier 152 and the rotational speed of the ring gear 153 are indicated along the axis of ordinates. The rotational speed of the sun gear 151, the rotational speed of the planetary carrier 152 and the rotational speed of the ring gear 153 at a given time are connected by a corresponding straight line in FIG. 3.

At the time of cooldown where the highest performance of the compressor device 130 is required, the control apparatus 160 activates the electromagnetic clutch 170, so that the drive force of the pulley 110 is conducted from the rotatable shaft 111 to the rotatable shaft 131 of the compressor device 130 through the planetary gear arrangement 150 to drive the compressor device 130. In this stage, the one-way clutch 180 is slipped. At this time, the control apparatus 160 also energizes the motor 120. Thus, the motor 120 is rotated in the second direction (the reverse rotational direction of the pulley 110), so that the rotational speed of the compressor device 130 becomes higher than the rotational speed of the pulley 110 due to the combination of the drive force of the pulley 110 and the drive force of the motor 120 through the planetary gear arrangement 150, as indicated by "A" in FIG. 3. Here, when the rotational speed of the motor 120 is increased, the rotational speed of the compressor device 130 is increased accordingly. In this way, the required discharge amount of refrigerant discharged from the compressor device 130 is obtained by setting the appropriate rotational speed of the motor 120.

Next, at the time of normal cooling operation period after the cooldown, the control apparatus 160 activates the electromagnetic clutch 170, so that the compressor device 130 is driven by the drive force of the pulley 110 while the one way clutch 180 is slipped. At this time, as indicated by "B" in FIG. 3, rotation of the motor 120 in the first direction (the rotational direction of the pulley 110) is prevented by the one-way clutch 190, and thus the motor 120 is stopped (i.e., the rotational speed of the motor 120 is zero). Thus, the entire drive force of the pulley 110 is conducted to the compressor device 130 through the planetary gear arrangement 150, which increases the rotational speed of rotation conducted from the pulley 110, and thus the compressor device 130 is rotated at the higher rotational speed, which is higher than that of the pulley 110.

Furthermore, when the engine 10 is stopped according to the idling-stop request in the temporarily stopped state of the vehicle, the control apparatus 160 deactivates the electromagnetic clutch 170 to drive the compressor device 130 by the drive force of the motor 120 (alternatively, the electromagnetic clutch 170 can be activated if desired). At this time, as indicated by "C" in FIG. 3, the motor 120 is rotated in the second direction (the reverse rotational direction of the pulley 110), so that the rotatable shaft 111 of the pulley 110 is also driven to rotate in the second direction (the reverse rotational direction of the pulley 110). However, at this time, the rotation of the rotatable shaft 111 of the pulley 110 is prevented by the one-way clutch 180, so that the drive force of the motor 120 is conducted to the compressor device 130. In this stage, when the rotational speed of the motor 120 is increased, the rotational speed of the compressor device 130 is increased accordingly. Thus, the required discharge amount of refrigerant can be achieved by setting the corresponding rotational speed of the motor 120.

It should be understood that even at the time of driving the engine 10, the electromagnetic clutch 170 can be deactivated, so that the motor 120 can be driven in the second direction (the reverse rotational direction of the pulley 110) to drive the compressor device 130 in a manner similar to that of the time of engine stop described above.

Characteristic control operation of the motor 120 and characteristic control operation of the electromagnetic clutch 170 (i.e., characteristic control operation of the compressor device 130) right after the restarting of the engine 10 (i.e., during the normal idling operation of the engine 10) upon removal of the idling-stop request at the time of idling-stop in the temporarily stopped state of the vehicle will be described. Here, the removal of the idling-stop request is performed based on the operational state of an auxiliary device, which is other than the motor 120 and is driven by the engine 10, and/or the thermal load state of the refrigeration cycle system 200.

Figure 4:
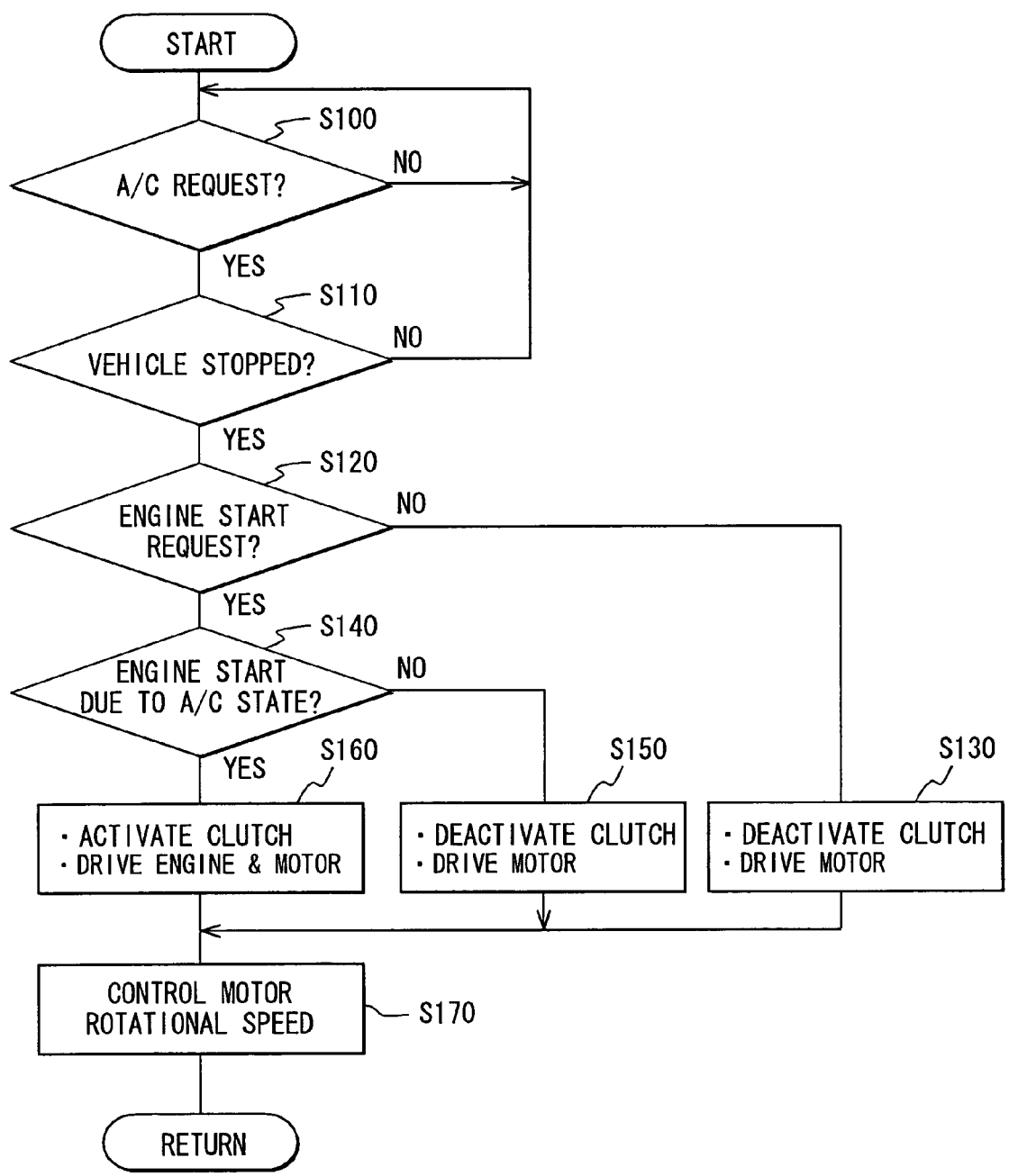
FIG. 4 is a flowchart showing control operation of the motor and an electromagnetic clutch of the hybrid compressor apparatus of the first embodiment.

With reference to FIG. 4, first, at step S100, it is determined whether the A/C request exists, i.e., whether the A/C request signal exists. When it is determined that the A/C request exists at step S100, control proceeds to step S110. On the other hand, when it is determined that the A/C request does not exist at step S100, control repeats step S100. At step S110, it is determined whether the vehicle is in the temporarily stopped state based on the vehicle speed signal. When it is determined that the vehicle is in the temporarily stopped state at step S110, control proceeds to step S120. On the other hand, when it is determined that the vehicle is not in the temporarily stopped state, control returns to step S100.

At step S120, it is determined whether an engine start request exists upon clearing the idling-stop request. When the answer to the inquiry at step S120 is NO, i.e., when the engine is still in the idling-stop state, in which the idling of the engine is stopped, control proceeds to step S130. At step S130, the normal control operation is performed such that the motor 120 is driven to drive the compressor device 130 ("a" in FIG. 5C and "a" in FIG. 6C).

When it is determined that the engine start request exists at step S120, control proceeds to step S140. At step S140, it is determined whether the engine start request is issued due to the thermal load state (A/C state) of the refrigeration cycle system 200 or operational state of any other auxiliary device (the operational state of any other auxiliary device will be referred to as an operational state other than the A/C state). Here, when the thermal load of the refrigeration cycle system 200 is relatively high, and thus sufficient cooling capacity cannot be achieved by driving of only the motor 120 to drive the compressor device 130, it is determined that the engine start request is issued due to the thermal load state (A/C state) of the refrigeration cycle system 200. On the other hand, when an auxiliary device(s), such as a power generator (or dynamo) 12, a brake booster, a heating device, cannot achieve sufficient performance at the time of engine stop, it is determined that the engine start request is issued due to the operational state of other auxiliary device.

When it is determined that the engine start request is issued due to the operational state other than the A/C state at step S140 ("b" in FIG. 5B), control proceeds to step S150. At step S150, the electromagnetic clutch 170 is deactivated, and the motor 120 is driven ("c" in FIG. 5C). That is, in the prior art case, the engine is started to drive the compressor device by the drive force of the engine. However, in the present embodiment, the drive force of the engine 10 is used for driving the auxiliary device(s), and the compressor device 130 is driven only by the drive force of the motor 120.

On the other hand, when it is determined that the engine start request is issued due to the A/C state ("d" in FIG. 6B) at step S140, control proceeds to step S160. At step S160, the electromagnetic clutch 170 is activated, and the motor 120 is driven ("e" in FIG. 6C). That is, the compressor device 130 is operated at the higher rotational speed, which is obtained by adding the rotational speed of the motor 120 to the rotational speed of the engine 10 through the planetary gear arrangement 150. In this way, the relatively high thermal load can be handled.

After any one of steps S130, S150, S160, control proceeds to step S170. At step S170, the rotational speed of the motor 120 is changed based on the thermal load of the refrigeration cycle system 200.

Figure 5A:
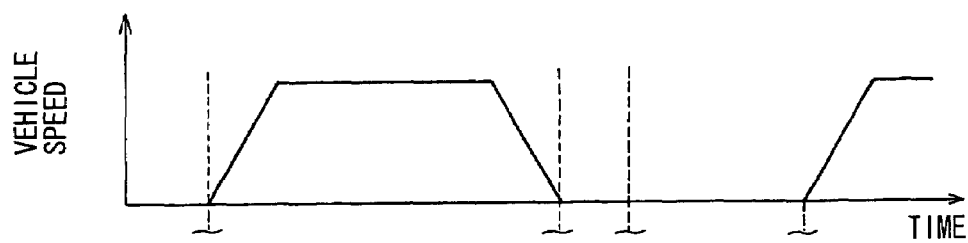
FIG. 5A is a time chart indicating a vehicle speed in a case where an engine is started due to an operational state of an auxiliary device.
Figure 5B:
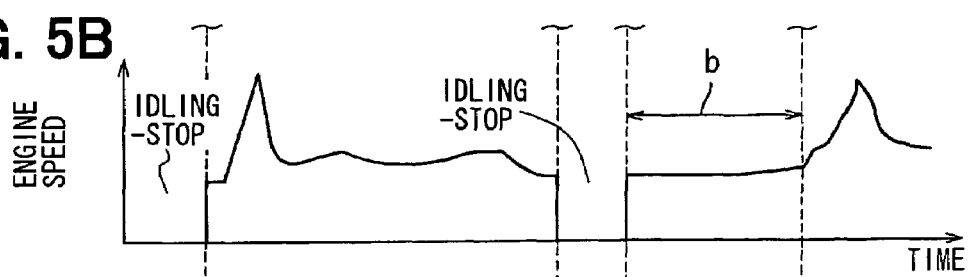
FIG. 5B is a time chart indicating an engine speed in the case where the engine is started due to the operational state of the auxiliary device.
Figure 5C:
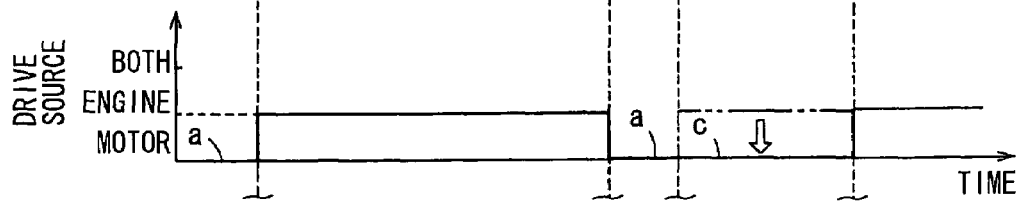
FIG. 5C is a time chart indicating a drive source(s) of the compressor device selected from one or both of the engine and a motor in the case where the engine is started due to the operational state of the auxiliary device.
Figure 5D:
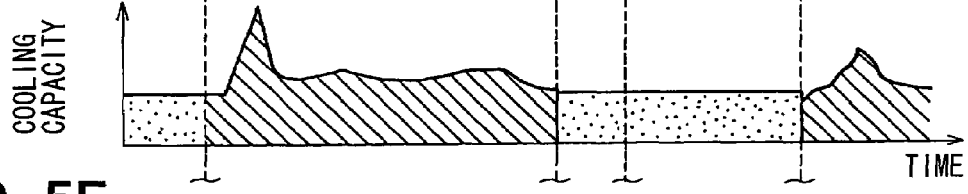
FIG. 5D is a time chart indicating a cooling capacity in the case where the engine is started due to the operational state of the auxiliary device.
Figure 5E:
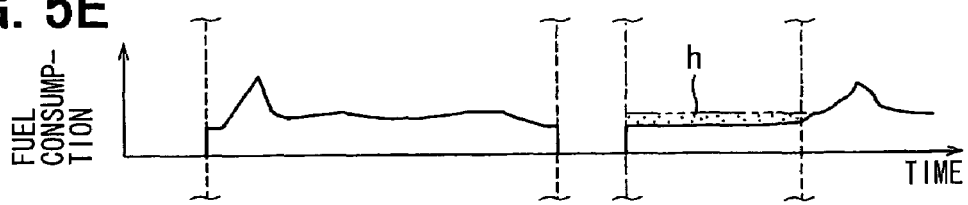
FIG. 5E is a time chart indicating fuel consumption in the case where the engine is started due to the operational state of the auxiliary device.
Figure 5F:
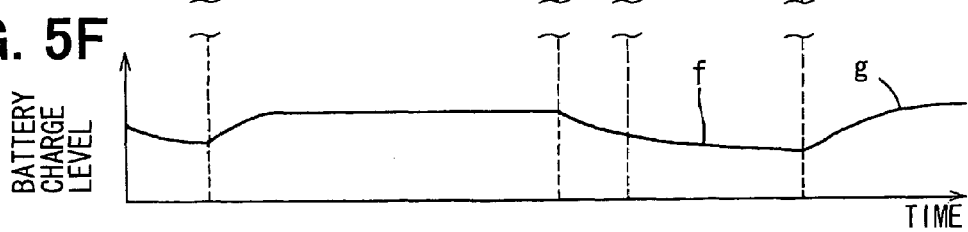
FIG. 5F is a time chart indicating a battery charge level in the case where the engine is started due to the operational state of the auxiliary device.
Figure 6A:
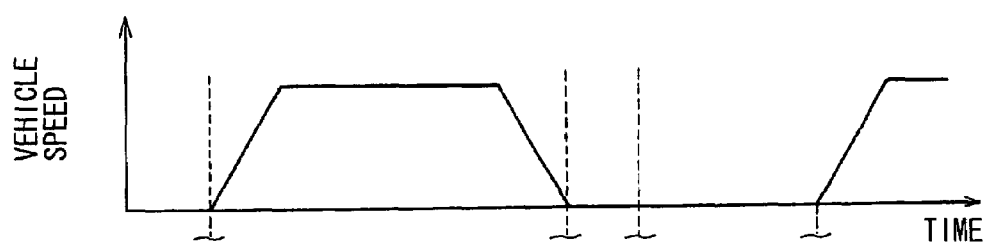
FIG. 6A is a time chart indicating a vehicle speed in a case where the engine is started due to a thermal load state of the refrigeration cycle system.
Figure 6B:
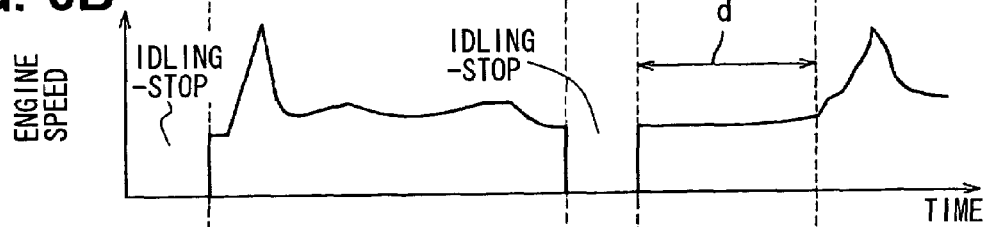
FIG. 6B is a time chart indicating an engine speed in the case where the engine is started due to the thermal load state of the refrigeration cycle system.
Figure 6C:
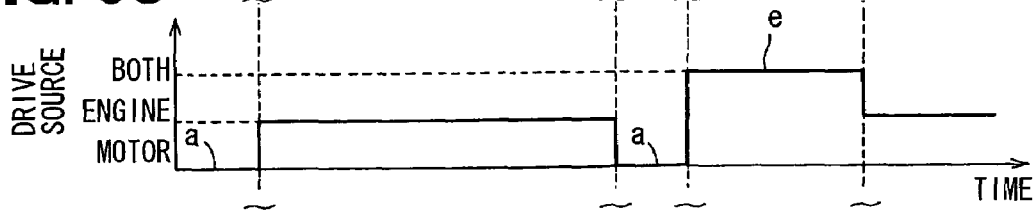
FIG. 6C is a time chart indicating a drive source(s) of the compressor device selected from one or both of the engine and a motor in the case where the engine is started due to the thermal load state of the refrigeration cycle system.
Figure 6D:
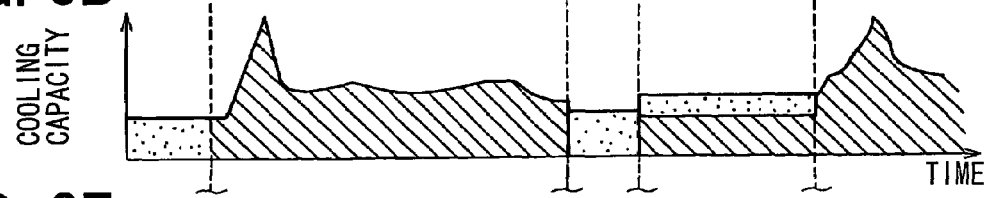
FIG. 6D is a time chart indicating a cooling capacity in the case where the engine is started due to the thermal load state of the refrigeration cycle system.
Figure 6E:
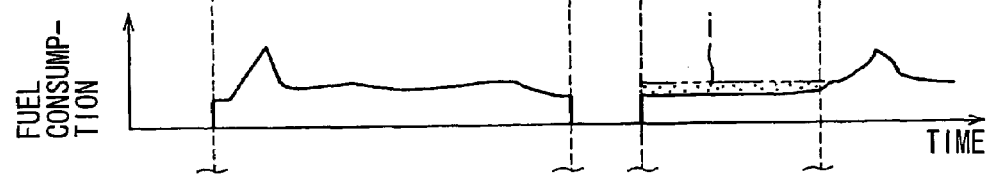
FIG. 6E is a time chart indicating fuel consumption in the case where the engine is started due to the thermal load state of the refrigeration cycle system.
Figure 6F:
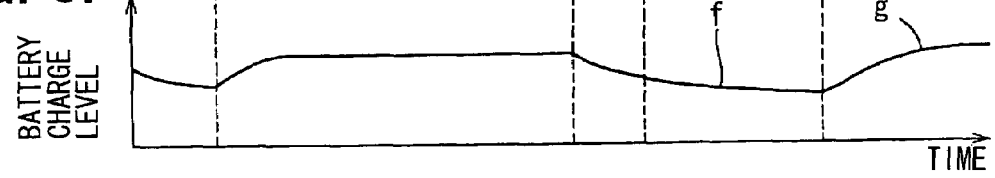
FIG. 6F is a time chart indicating battery charge level in the case where the engine is started due to the thermal load state of the refrigeration cycle system.

When the vehicle is moved once again after the temporary stop of the vehicle, the lost electricity of the battery 20, which is used to drive the motor 120 in the temporarily stopped state of the vehicle ("f" in FIG. 5F, and "f" of FIG. 6F), is recharged into the battery 20 through power generation with the power generator 12 driven by the engine 10 ("g" in FIG. 5F and "g" in FIG. 6F).

As described above, in the state where the engine 10 is restarted in the temporarily stopped state of the vehicle after the termination of the idling-stop, the motor 120 is driven. Thus, the drive force of the motor 120 can be used to drive the compressor device 130. This allows a reduction in the load of the engine 10 and thus allows improvement of fuel consumption ("h" in FIG. 5E and "i" in FIG. 6E).

Specifically, in general, when the engine 10 is driven due to the operational state of the auxiliary device(s), the thermal load of the refrigeration cycle system 200 is not relatively high. Thus, the required cooling capacity can be achieved by driving the compressor device 130 only by the motor 120. Therefore, at the time of operation of the engine 10 in the idling mode, the electromagnetic clutch 170 is deactivated, and the motor 120 is driven. As a result, the load of the engine 10 is alleviated by an amount, which corresponds to the load required to drive the compressor device 130, and thereby the fuel consumption can be advantageously improved.

When the engine 10 is driven due to the thermal load of the refrigeration cycle system 200, relatively large cooling capacity is required. At this time, the compressor device 130 is driven by the drive force of the engine 10 and the drive force of the motor 120. Thus, an increase in the load of the engine 10 is not required, and thus fuel consumption can be improved.

In the present embodiment, the planetary gear arrangement 150 is used as the drive force distributing mechanism for adding the drive force of the motor 120 to the drive force of the engine 10.

When the motor 120 is driven, the rotational speed of the motor 120 is changed based on the thermal load of the refrigeration cycle system 200. Thus, use of the motor 120 is kept at the minimum level to reduce consumption of electric power supplied from the battery 20.

The vehicle, in which the present invention is embodied, can be a hybrid vehicle that has a vehicle drive motor for driving the vehicle and stops its engine under a predetermined driving state even when the vehicle is running.

Second Embodiment

Figure 7:
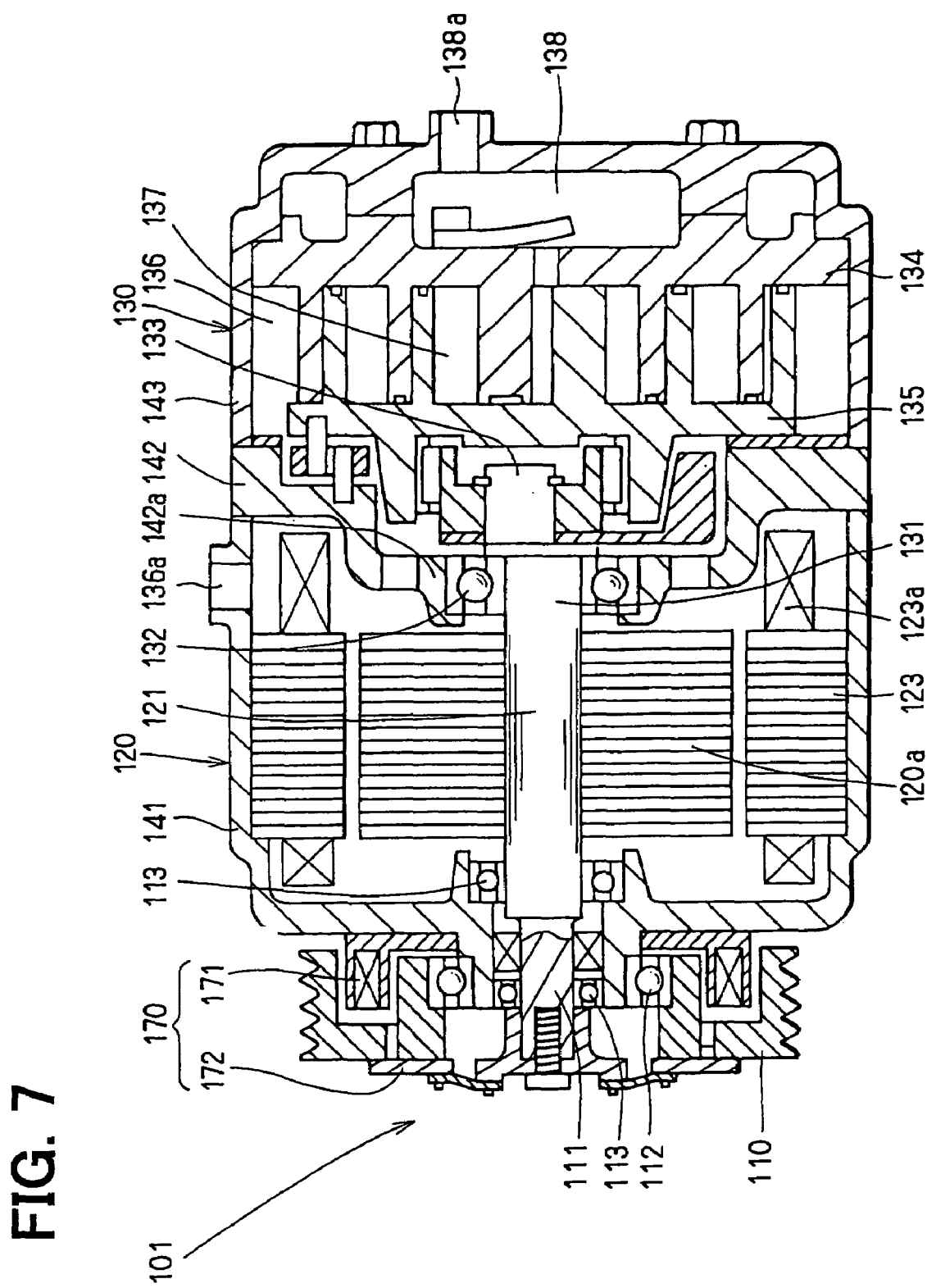
FIG. 7 is a cross sectional view of a hybrid compressor apparatus according to a second embodiment of the present invention.

A second embodiment of the present invention will be described with reference to FIGS. 7 and 8. The second embodiment differs from the first embodiment in the structure of the hybrid compressor apparatus 101.

In the hybrid compressor apparatus 101 of the second embodiment, the planetary gear arrangement 150 and the one-way clutches 180, 190 of the first embodiment are eliminated. Furthermore, the rotatable shaft 111 of the pulley 110 and the rotatable shaft 121 of the motor 120 are aligned along a common straight line and are directly connected to one another, and the rotatable shaft 121 of the motor 120 and the rotatable shaft 131 of the compressor device 130 are aligned along the common straight line and are connected to one another.

In the second embodiment, at the time of driving the engine 10, the electromagnetic clutch 170 is activated by the control apparatus 160 without energizing the coil arrangement 123a of the motor 120. Thus, the compressor device 130 is driven by the drive force of the engine 10. Furthermore, at the time of idling-stop, the electromagnetic clutch 170 is deactivated, and the compressor device 130 is driven by the drive force of the motor 120.

Figure 8:
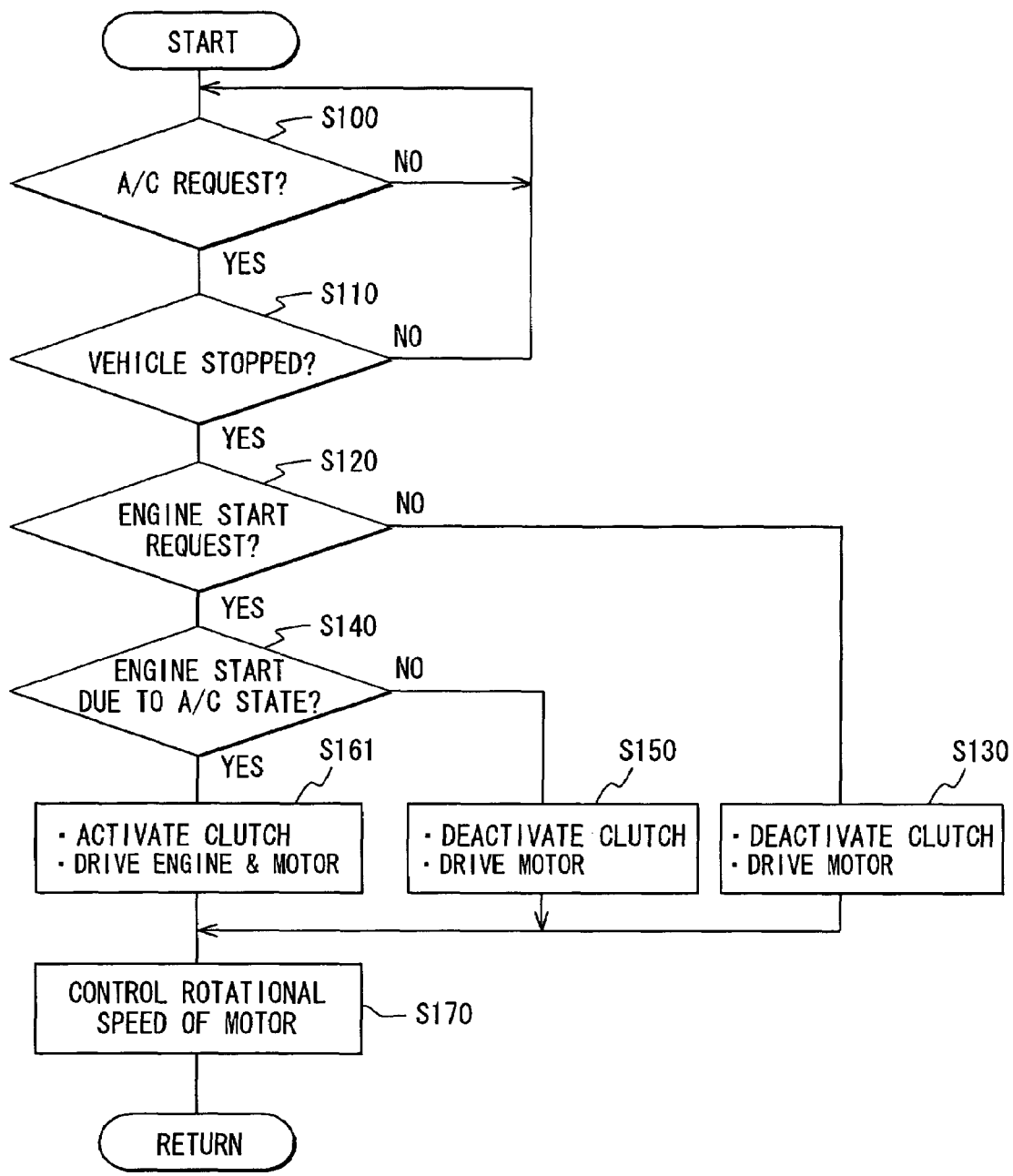
FIG. 8 is a flowchart showing control operation of a motor and an electromagnetic clutch of the hybrid compressor apparatus of the second embodiment.

Then, as shown in a flowchart of FIG. 8, when the engine 10 is started, i.e., when the engine 10 is placed in the idling state due to the operational state other than the A/C state after the idling-stop in the temporarily stopped state of the vehicle, control proceeds to step S150 where the electromagnetic clutch 170 is deactivated, and the compressor device 130 is driven by the drive force of the motor 120 in a manner similar to that of the first embodiment. In this way, like in the first embodiment, the load of the engine 10 can be alleviated by an amount, which corresponds to the load required to drive the compressor device 130.

Furthermore, when the engine 10 is started due to the A/C state, control proceeds to step S161 where the electromagnetic clutch 170 is activated to drive the compressor device 130 by the drive force of the engine 10, and the coil arrangement 123a is energized to drive the motor 120. In this way, the drive force exerted by the rotatable shaft 121 of the motor 120 can be used for driving the compressor device 130, and thus the high thermal load can be handled without increasing the load of the engine 10.

Third Embodiment

Figure 9:
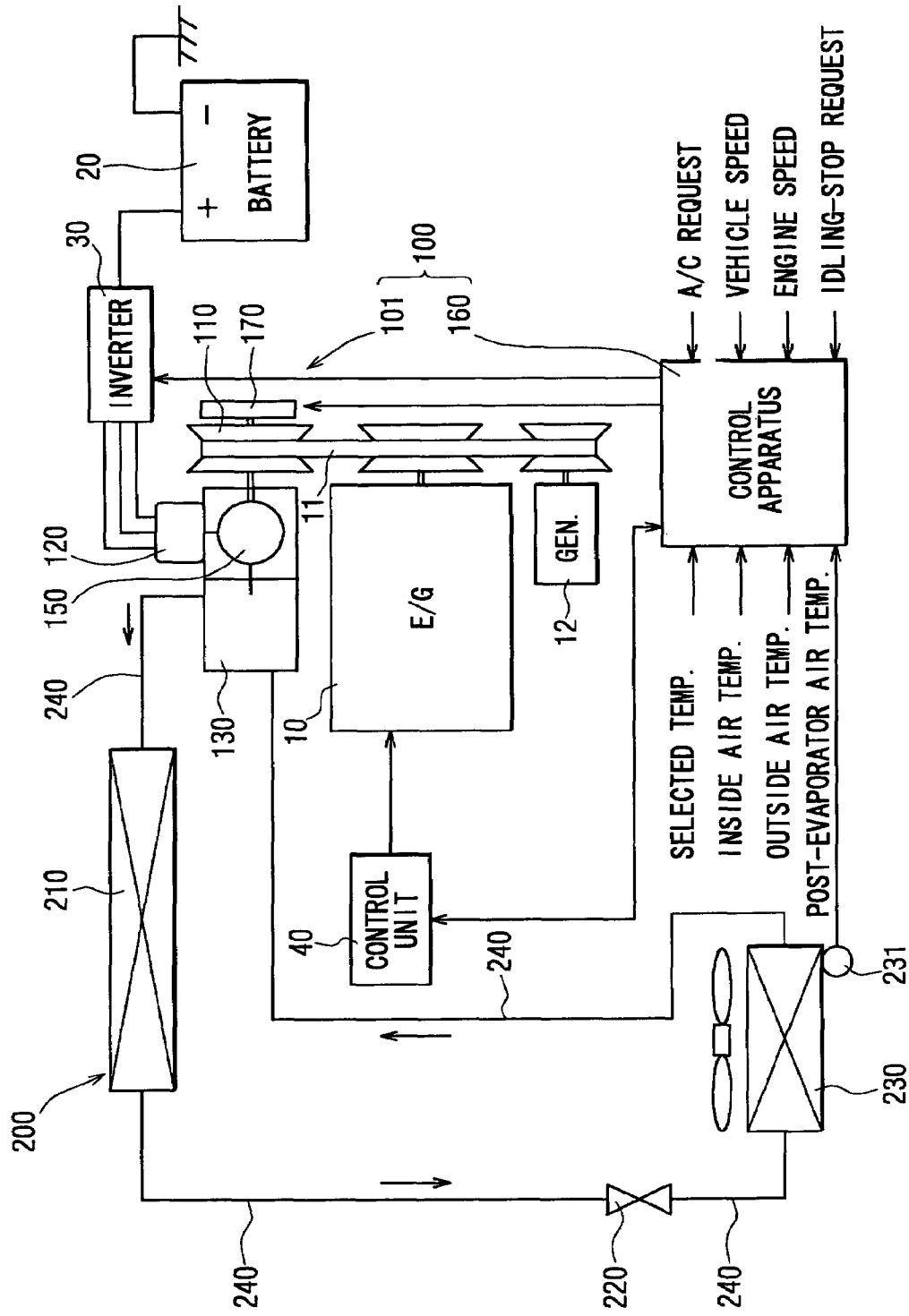
FIG. 9 is a schematic view of a refrigeration cycle system according to a third embodiment of the present invention.

A third embodiment of the present invention will be described with reference to FIGS. 9 and 10. In the third embodiment, the present invention is embodied in a refrigeration cycle system for an ordinary vehicle that does not stop an engine based on the driving state of the vehicle.

A basic structure of the third embodiment is substantially similar to that of the first embodiment shown in FIG. 1. However, the engine 10 includes an engine control unit 40, which controls operation of the engine 10 through adjustment of the fuel injection amount and fuel injection timing of the engine 10. Various information is communicated between the engine control unit 40 and the control apparatus 160 of the hybrid compressor apparatus 101.

Figure 10:
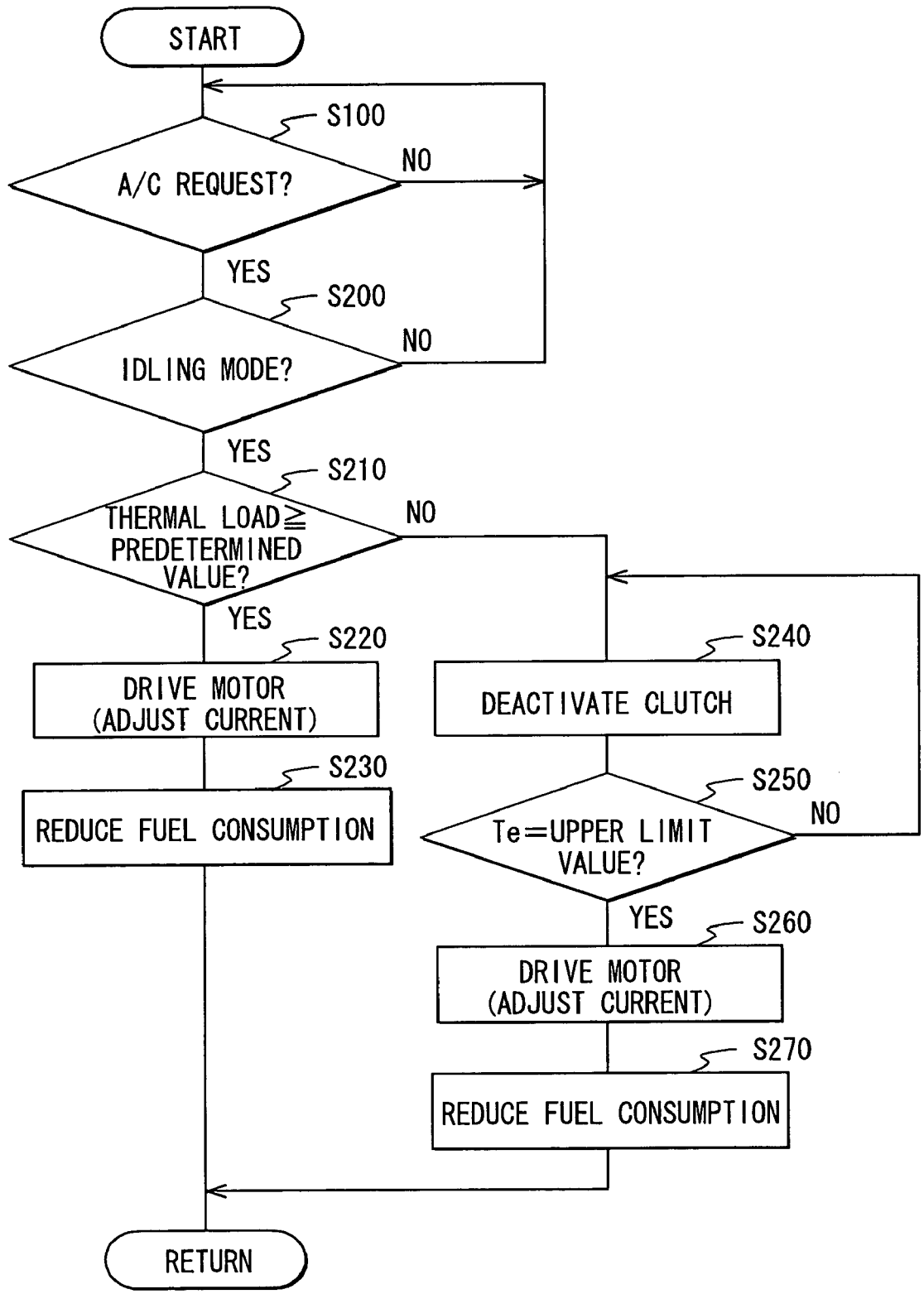
FIG. 10 is a flowchart showing control operation of a motor and an electromagnetic clutch of a hybrid compressor apparatus of the refrigeration cycle system of the third embodiment.

In this embodiment, at the time of idling operation of the vehicle, the control apparatus 160 controls the motor 120 and the electromagnetic clutch 170 of the hybrid compressor apparatus 101 according to a flowchart shown in FIG. 10. This control operation (including control operation performed by the engine control unit 40) will be described below.

First, at step S100, it is determined whether the A/C request exists, i.e., whether the A/C request signal exists. When it is determined that the A/C request exists at step S100, control proceeds to step S200. On the other hand, when it is determined that the A/C request does not exist at step S100, control repeats step S100. At step S200, it is determined whether the vehicle is in an idling mode. When YES is returned at step S200, control proceeds to step S210. On the other hand, when NO is returned at step S200, control returns to step S100.

At step S210, it is determined whether the thermal load of A/C is equal to or greater than a predetermined value. The thermal load of A/C becomes greater than the predetermined value, for example, at the time of cooldown. When it is determined that the thermal load of A/C is equal to or greater than the predetermined value at step S210, control proceeds to step S220. At step S220, the motor 120 is operated, i.e., is energized by the electric power (electric current) supplied from the battery 20 to operate the compressor device 130 by the drive force of the engine 10 and also the drive force of the motor 120. The electric power supplied to the motor 120 is adjusted according to the thermal load of A/C. More specifically, when the thermal load of A/C is increased, the electric power supplied to the motor 120 is increased accordingly.

Then, at step S230, the engine control unit 40 reduces the fuel consumption based on a corresponding signal(s), which indicates the information (operation of the motor 120), transmitted from the control apparatus 160.

On the other hand, when it is determined that the thermal load of A/C is smaller than the predetermined value at step S210, control proceeds to step S240. At step S240, the electromagnetic clutch 170 is deactivated. Then, at step S250, it is determined whether the post-evaporator air temperature (Te) has reached, i.e., is equal to an upper limit value of the temperature required to achieve the desired cooling. When YES is returned at step S250, control proceeds to step S260. On the other hand, when NO is returned at step S250, control returns to step S240. At step S260, the motor 120 is driven. More specifically, when the thermal load of A/C is relatively small at the time of idling of the vehicle, the electromagnetic clutch 170 is deactivated, and the motor 120 is driven to drive the compressor device 130 only by the drive force of the motor 120. The electric power (electric current) supplied to the motor 120 is adjusted according to the thermal load of A/C. More specifically, when the thermal load of A/C is increased, the amount of electric power supply to the motor 120 is increased accordingly.

Then, similar to step S230, at step S270, the engine control unit 40 reduces the fuel consumption based on the corresponding signal(s), which indicates information (operation of the motor 120), transmitted from the control apparatus 160.

In this way, the drive force of the motor 120 can be used to drive the compressor device 130. Thus, the load of the engine 10 at the time of idling of the engine 10 can be reduced to improve the fuel consumption.

Furthermore, an increase in the electric power supplied to the motor 120 allows a decrease in the load on the engine 10. Also, the fuel consumption is reduced by the engine control unit 40. Thus, the fuel consumption can be quickly shifted to an appropriate level while limiting fluctuations in the operation of the engine 10. This allows an improvement in the fuel consumption of the engine 10.

When the motor 120 is driven, the electric power is supplied from the battery 20 to the motor 120. Thus, the load on the engine 10 is not increased at this time. That is, for example, when the power generator 12 provided to the engine 10 is used as a power source of the motor 120, the load of the engine 10 is increased by the amount, which corresponds to the amount of electricity consumed by the motor 120, due to the operation of the power generator 120. However, when the battery 20 is used as the power source, such a problem can be avoided. The lost electricity of the battery 20 is recharged into the battery 20 through power generation with the power generator 12 during the normal driving of the vehicle, as described with reference to the first embodiment ("f" in FIG. 5F and "f" in FIG. 6F).

(Modifications)

In the first to third embodiments, the scroll type compressor device is used as the compressor device 130. However, the present invention is not limited to the scroll type compressor device. For example, the compressor device 130 can be of a rotary type or of a piston type.

In the first and third embodiments, the planetary gear arrangement 150 is used as the drive force distributing mechanism. However, for example, a planetary roller or a differential gear can be used in place of the planetary gear arrangement 150.

In the first embodiment, the rotatable shaft 121 of the motor 120 is connected to the sun gear 151, and the rotatable shaft 131 of the compressor device 130 is connected to the ring gear 153. Alternatively, the rotatable shaft 121 of the motor 120 can be connected to the ring gear 153, and the rotatable shaft 131 of the compressor device 130 can be connected to the sun gear 151.

Additional advantages and modifications will readily occur to those skilled in the art. The invention in its broader terms is therefore not limited to the specific details, representative apparatus, and illustrative examples shown and described.

What is claimed is:

1. A hybrid compressor system for a refrigeration cycle system of a vehicle that includes an internal combustion engine and an electric power source, the hybrid compressor system comprising:
   an electric motor that is rotated when the motor is energized by electric power supplied from the power source;
   a compressor device that compresses refrigerant of the refrigeration cycle system and is connected to the engine and the motor to selectively receive drive force from one or both of the engine and the motor; and
   a control apparatus that controls the motor, wherein:
   a clutch is provided only between the engine and the compressor in the hybrid compressor system to enable and disable transmission of a drive power from the engine to the compressor;
   when the engine is operated in an idling mode in a stopped state of the vehicle, the control apparatus selects and executes one of a plurality of operational modes, which includes first and second operational modes, to adjust engine load;
   the control apparatus energizes the motor to drive the compressor device by the motor alone without using the power from the engine by decoupling the clutch to disable the transmission of the power from the engine to the compressor in the first operational mode;
   the control apparatus energizes the motor to drive the compressor device in cooperation with the engine through use of the power from the engine by coupling the clutch in the second operational mode;
   the vehicle is of a type that normally stops the engine when the vehicle is temporarily stopped; and
   when the engine is operated in the idling mode in the temporarily stopped state of the vehicle due to an operational state of an auxiliary device driven by the engine or due to thermal load state of the refrigeration cycle system, the control apparatus energizes the motor.

2. The hybrid compressor system according to claim 1, wherein:
   the vehicle further includes an engine control unit, which controls the engine; and
   when the compressor device is driven at the time of operating the engine in the idling mode, the control apparatus increases the electric power supplied to the motor to reduce the load on the engine and, at the same time; transmits a signal to the engine control unit to control fuel injection of the engine in a manner that reduces fuel consumption of the engine.

3. The hybrid compressor system according to claim 1, wherein the power source is a vehicle battery.

4. The hybrid compressor system according to claim 1, further comprising a connecting mechanism that is placed between the engine and the compressor device and selectively enables and disables conduction of drive force from the engine to the compressor device, wherein when the control apparatus controls the energization of the motor to adjust the load on the engine, the control apparatus also controls the connecting mechanism to control conduction of drive force from the engine to the compressor device.

5. The hybrid compressor system according to claim 4, wherein:
   the vehicle further includes an engine control unit, which controls the engine; and when the control apparatus controls the connecting mechanism to disable conduction of drive force from the engine to the compressor device and thereby to reduce the load on the engine, the control apparatus transmits a signal to the engine control unit to control fuel injection of the engine in a manner that reduces fuel consumption of the engine.

6. The hybrid compressor system according to claim 4, wherein:
when the motor drives the compressor device alone, the control apparatus controls the connecting mechanism to disable conduction of drive force from the engine to the compressor device; and
when the motor drives the compressor device in cooperation with the engine, the control apparatus controls the connecting mechanism to enable conduction of drive force from the engine to the compressor device.

7. The hybrid compressor system according to claim 1, further comprising a connecting mechanism that is placed between the engine and the compressor device and selectively enables and disables conduction of drive force from the engine to the compressor device, wherein when the engine is driven in the idling mode in the temporarily stopped state of the vehicle due to the operational state of the auxiliary device, the control apparatus controls the connecting mechanism to disable conduction of drive force from the engine to the compressor device.

8. The hybrid compressor system according to claim 1, further comprising a connecting mechanism that is placed between the engine and the compressor device and selectively enables and disables conduction of drive force from the engine to the compressor device, wherein when the engine is driven in the idling mode in the temporarily stopped state of the vehicle due to the thermal load state of the refrigeration cycle system, the control apparatus controls the connecting mechanism to enable conduction of drive force from the engine to the compressor device.

9. The hybrid compressor system according to claim 1, further comprising a drive force distributing mechanism that distributes the drive force of the engine to the motor and the compressor device and conducts the drive force of the motor to the engine and the compressor device, wherein when the motor is energized, the drive force distributing mechanism conducts both the drive force of the motor and the drive force of the engine to the compressor device.

10. The hybrid compressor system according to claim 9, wherein the drive force distributing mechanism is a planetary gear arrangement.

11. The hybrid compressor system according to claim 1, wherein:
the motor includes a rotatable shaft;
the compressor device includes a rotatable shaft that is directly joined with the rotatable shaft of the motor; and
when the motor is energized, drive force exerted on the rotatable shaft of the motor is conducted to the rotatable shaft of the compressor device.

12. The hybrid compressor system according to claim 1, wherein when the engine is operated in the idling mode, and the motor is energized, the control apparatus changes a rotational speed of the motor based on the thermal load state of the refrigeration cycle system.

* * * * *